(12) United States Patent
Carlin

(10) Patent No.: US 9,560,935 B2
(45) Date of Patent: Feb. 7, 2017

(54) PIVOTAL MULTI-FUNCTIONAL GRILL TOOL

(71) Applicant: Todd D. Carlin, Bowling Green, KY (US)

(72) Inventor: Todd D. Carlin, Bowling Green, KY (US)

( * ) Notice: Subject to any disclaimer, the term of this patent is extended or adjusted under 35 U.S.C. 154(b) by 0 days.

(21) Appl. No.: 14/755,328

(22) Filed: Jun. 30, 2015

(65) Prior Publication Data

US 2016/0007800 A1    Jan. 14, 2016

Related U.S. Application Data

(60) Provisional application No. 62/024,266, filed on Jul. 14, 2014.

(51) Int. Cl.
*A47J 37/07*    (2006.01)
*A47J 45/10*    (2006.01)

(52) U.S. Cl.
CPC ............. *A47J 37/0786* (2013.01); *A47J 45/10* (2013.01)

(58) Field of Classification Search
CPC .............................. A47J 37/0786; A47J 45/10
USPC ................. 294/16, 118, 28, 31.1, 11, 13
See application file for complete search history.

(56) References Cited

U.S. PATENT DOCUMENTS

| | | |
|---|---|---|
| 613,355 A | 11/1898 | Burton |
| 749,110 A | 1/1904 | Spangler |
| 1,455,216 A | 5/1922 | Lombardi |
| 1,484,100 A | 2/1924 | Wertz |
| 1,870,133 A * | 8/1932 | Myers ........................ B25B 7/00 15/104.011 |
| 2,892,655 A | 6/1959 | Bower |
| 4,471,985 A | 9/1984 | Mahoney |
| 4,483,221 A * | 11/1984 | Hoskins ..................... B67B 7/18 294/118 |
| 5,346,268 A | 9/1994 | Baker |
| 5,655,806 A | 8/1997 | Halladay |
| 5,727,828 A * | 3/1998 | Jones ........................ A01B 1/18 294/118 |
| 5,934,721 A | 8/1999 | Walde |
| 6,345,558 B1 * | 2/2002 | Wilson ....................... B25B 7/02 81/420 |
| 6,959,951 B2 | 11/2005 | Amodeo |
| 8,091,936 B1 | 1/2012 | Graziano |
| 8,251,416 B1 | 8/2012 | Oberg et al. |
| 8,556,310 B1 * | 10/2013 | Nabors ............... A47J 37/0786 294/26 |

(Continued)

FOREIGN PATENT DOCUMENTS

DE    20016819 U1    2/2001

*Primary Examiner* — Paul T Chin
(74) *Attorney, Agent, or Firm* — Pitts & Lake, P.C.

(57) ABSTRACT

A pivotal multi-functional grill tool of the present invention includes first and second elongated arm members that are pivotally attached. The elongated arm members have each have first and second end members. Handle members are disposed at the respective second ends of the elongated arm members. Further, opposing jaw members are rigidly attached so as to be carried by the respective first ends of the elongated arm members. The opposing jaw members are adapted to engage at least a portion of the cooking grate and are further adapted for grasping charcoal briquettes, lump charcoal, or hardwood chunks used in grilling.

14 Claims, 6 Drawing Sheets

(56) References Cited

U.S. PATENT DOCUMENTS 8,579,341 B2 * 11/2013 Greer .................. A47J 37/0786
                                                    294/131
8,740,269 B2    6/2014 Greer
8,746,768 B1 *  6/2014 Coates ............... B01D 46/4227
                                                    294/118

* cited by examiner

PIVOTAL MULTI-FUNCTIONAL GRILL TOOL

CROSS-REFERENCE TO RELATED APPLICATIONS

This application claims the benefit of U.S. Provisional Patent Application No. 62/024,266, filed on Jul. 14, 2014, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to a pivotal tool useful in the grilling arts. More particularly, it relates to a pivotal multi-purpose tool having opposable pivotally attached ends adapted for grasping, among other things, a grill grate or other grill accessory.

2. Description of the Related Art

In the grilling arts, particularly the gas or charcoal grilling arts, it is known that it is undesirable to handle the grill grate with bare hands. If the grate is hot, it is dangerous to touch the grate. However, even if the grate is cool, particularly a seasoned grate, it is undesirable to handle the grate because the seasoned grates will transfer grease to the individual's hands. Additionally, especially in the charcoal and/or wood smoking grilling art, it is known that it is advantageous to be able to move hot briquettes or to place wood chunks in or around the fire. Further, other grill accessories, such as cedar grill planks, or ceramic grill stones which can be used on the cooking surface of the grill also become very hot. In this regard, it is desirable to have a tool that is adapted to grasp chunks of wood and/or charcoal and to lift the cooking grates or other grill cooking accessories.

In the known art, U.S. Pat. No. 4,471,985, issued to P. E. Mahoney on Sep. 18, 1984, describes a barbecue lifting tool, having a handle, an elongated shaft, and a grill engaging element. U.S. Pat. No. 5,346,268, issued to L. H. Baker et al on Sep. 13, 1994, describes a tool for lifting the grill off of a barbecue burner. U.S. Pat. No. 5,934,721, issued to A. Walde on Aug. 10, 1999, describes a multi-function, adjustable grip, barbecue tong assembly. U.S. Pat. No. 6,959,951, issued to J. C. Amodeo on Nov. 1, 2005, describes a wire rack and grill lifting tool having a handle connected to a flexible stabilizing member that engages the top surface of a wire rack, and a hook member that extends downwardly to engage and receive the wire rack. U.S. Pat. No. 8,556,310, issued to R. Nabors on Oct. 15, 2013, describes a grill hook device for lifting a cooking grate from a charcoal grill. U.S. Pat. No. 8,579,341, issued to J. K. Greer on Nov. 12, 2013, and U.S. Pat. No. 8,740,269, also issued to J. K. Greer on Jun. 3, 2014, both describe a grill grate lifter. Finally, Deutsch Patent No. 200 16819 U1, registered to M. Goldmann, on Jan. 4, 2001, describes tongs to be used for an open fire or barbecue.

Other similar tools are described in the following patents: U.S. Pat. No. 613,355, issued to R. G. Burton on Nov. 1, 1898, describes kitchen tongs. U.S. Pat. No. 749,110, issued to J. H. Spangler describes household tongs. U.S. Pat. No. 1,455,216, issued to M. Lombardi on May 15, 1923, describes an ash pan lifter. U.S. Pat. No. 1,484,100, issued to J. C. Wertz on Feb. 19, 1924, describes cinder tongs. U.S. Pat. No. 2,892,655, issued to B. F. Bower on Jun. 30, 1959, describes frankfurter tongs. U.S. Pat. No. 3,964,775, issued to L. E. Boyd on Jun. 22, 1976, describes a set of tongs. U.S. Pat. No. 5,655,806, issued to J. J. Halladay et al on Aug. 12, 1997, describes a pivotal set of tongs with tapered jaws for removing an inking plug from an ink container. U.S. Pat. No. 8,091,936, issued to M. V. Graziano on Jan. 10, 2012, describes a pivotally operated gripping device. U.S. Pat. No. 8,251,416, issued to J. D. Oberg on Aug. 28, 2012, describes a fireplace log handling device.

The problem with many such devices for lifting a cooking grate from a grill is that the known devices place the user's hands over the cooking grate and exposed to the direct heat of the flame. And, many of the known tools for lifting the cooking grate are not adapted for grasping and moving charcoal briquettes, chunks of wood, or other grill cooking accessories, such as cedar planks or ceramic grill stones. What is missing in the art is a pivotal grill tool for grasping and lifting a cooking grate from a grill, such as, but not limited to, a charcoal grill and for grasping and lifting grill accessories, and that has handle members that position the user's hands away from the direct heat of the flame.

BRIEF SUMMARY OF THE INVENTION

The pivotal multi-functional grill tool of the present invention includes first and second elongated arm members that are pivotally attached to one another. The elongated arm members each have first and second ends. Opposing jaw members are rigidly attached so as to be carried by the respective first ends of the elongated arm members. Further, handle members are disposed at the respective second ends of the elongated arm members. The opposing jaw members are adapted to engage at least a portion of the cooking grate and are also adapted for grasping charcoal briquettes, chunks of wood, and/or other grilling accessories, such as cedar planks and ceramic grill stones. The jaw members are adapted to engage at least a portion of the cooking grate and, in an exemplary embodiment, are in opposition to one another. Further, in an exemplary embodiment, the jaw members are disposed at an angle to the elongated arm members chosen such that the jaw members are substantially parallel to one another when they are spaced apart a selected distance. Further, each of the elongated arm members includes a bend proximate the jaw member. The bends are each adapted such that, in use, when the jaw members are substantially parallel to cooking grate, the elongated arm members define an acute angle with the cooking grate.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
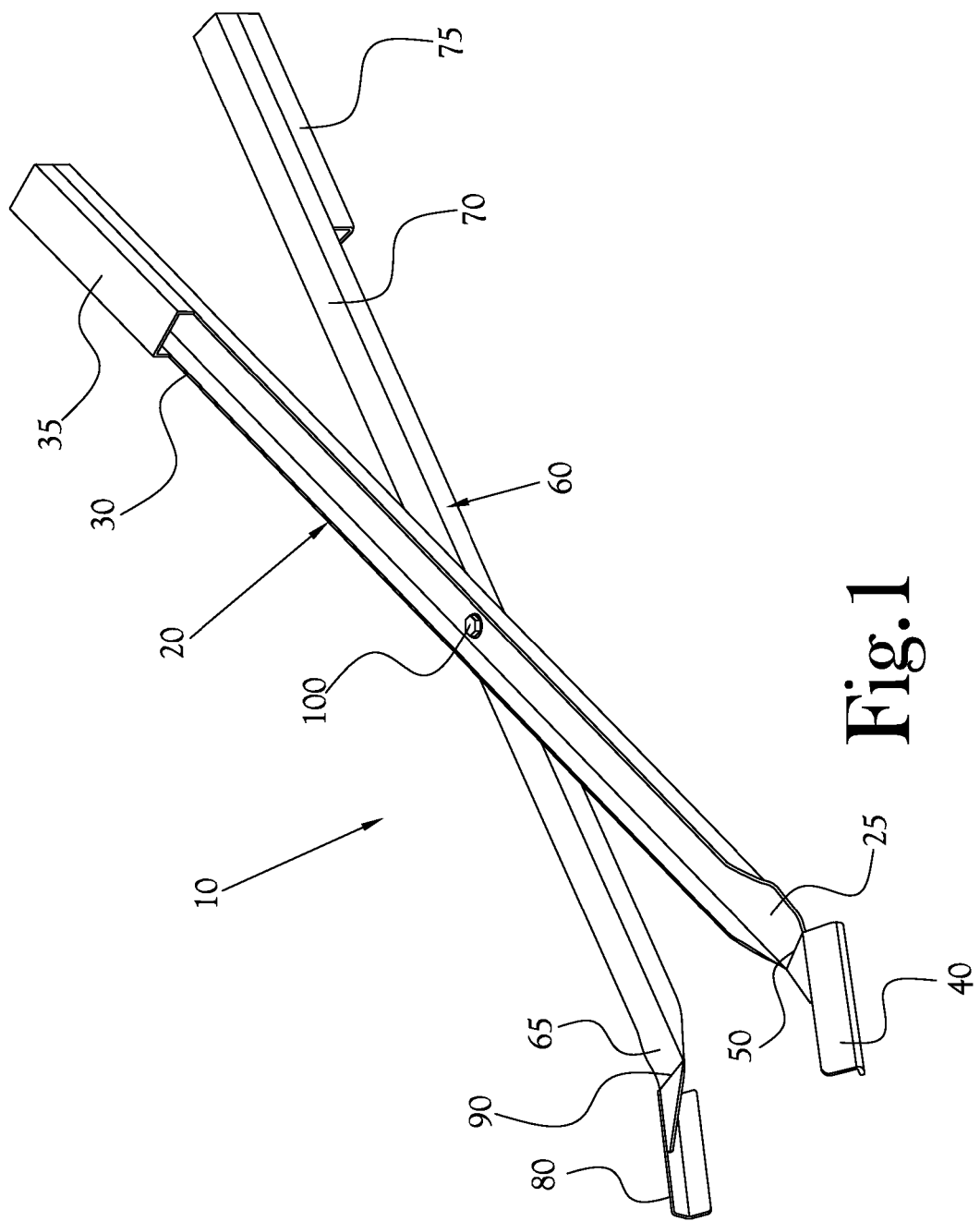
FIG. 1 is an upper perspective view of the pivotal multi-functional grill tool of the present invention. It should be recognized that with regard to the description of the orientation of the illustrated device and the Figure descriptions herein, that the term "upper" or "upper side" refers to the upper side when the device is in use, while "lower" or "lower side" refers to the side of the device closest to the grill grate when in use.
Figure 2:
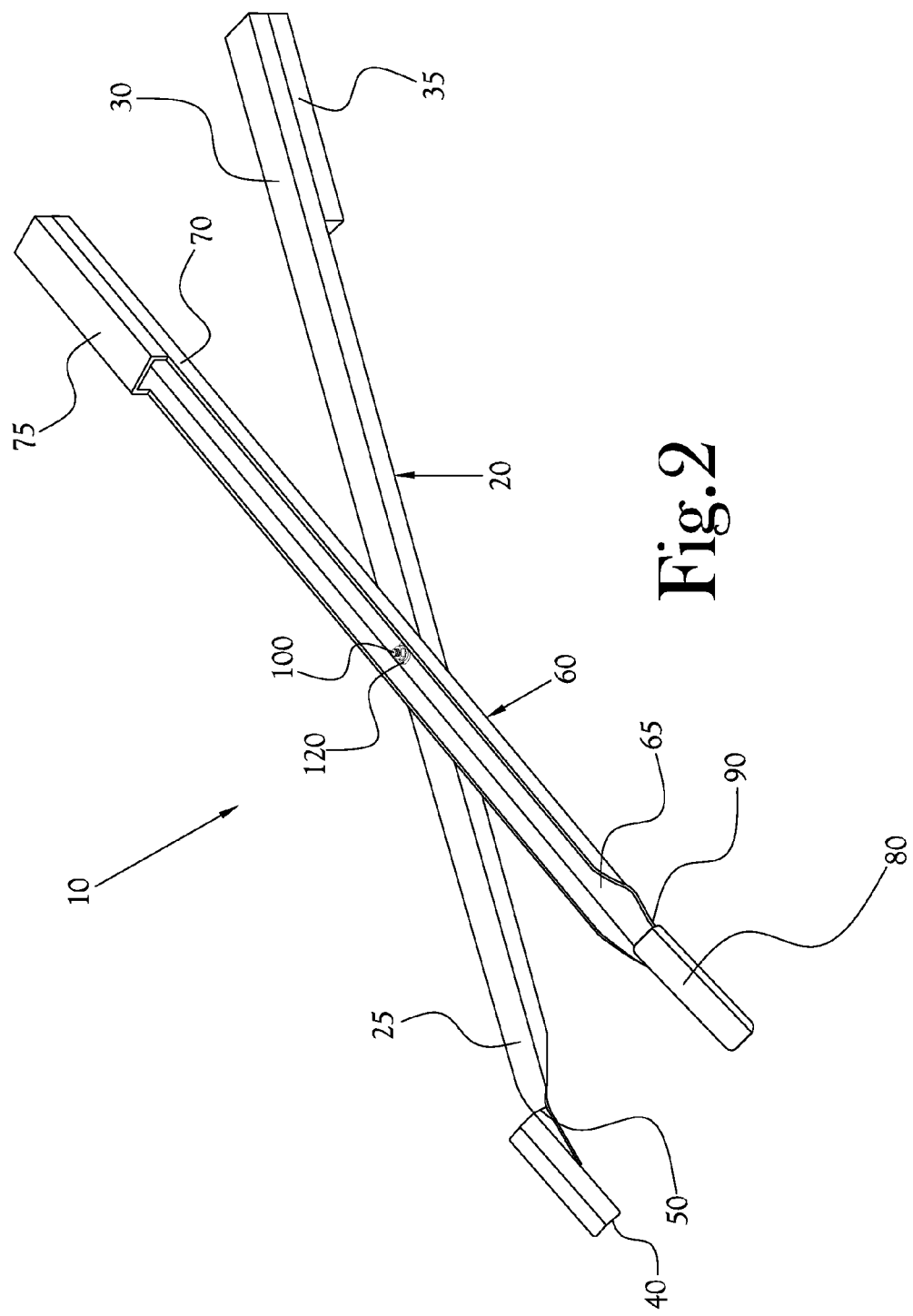
FIG. 2 is a lower perspective view of the pivotal multi-functional grill tool illustrated in FIG. 1.
Figure 3:
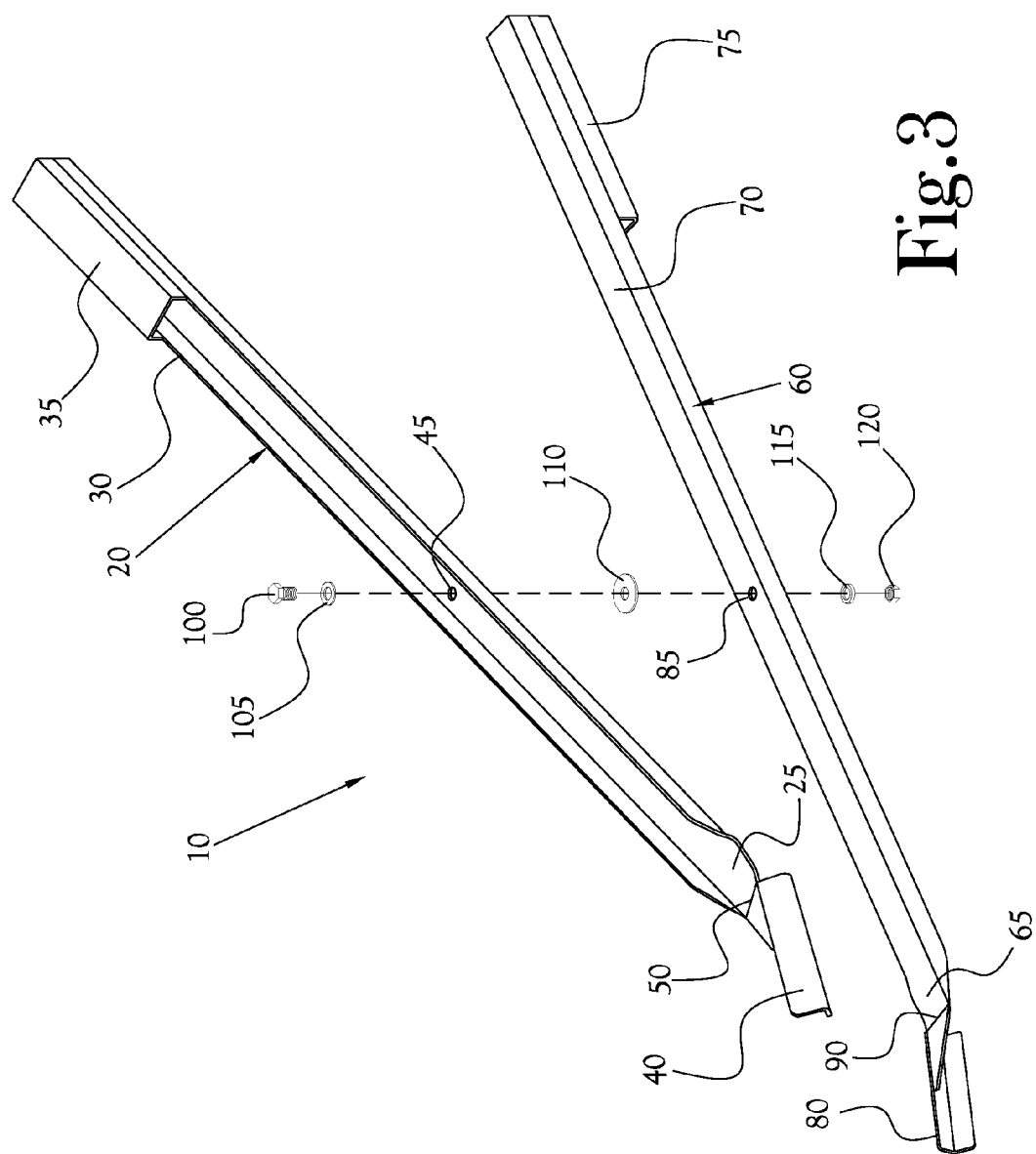
FIG. 3 is an exploded view of the pivotal multi-functional grill tool illustrated in FIG. 1.
Figure 4:
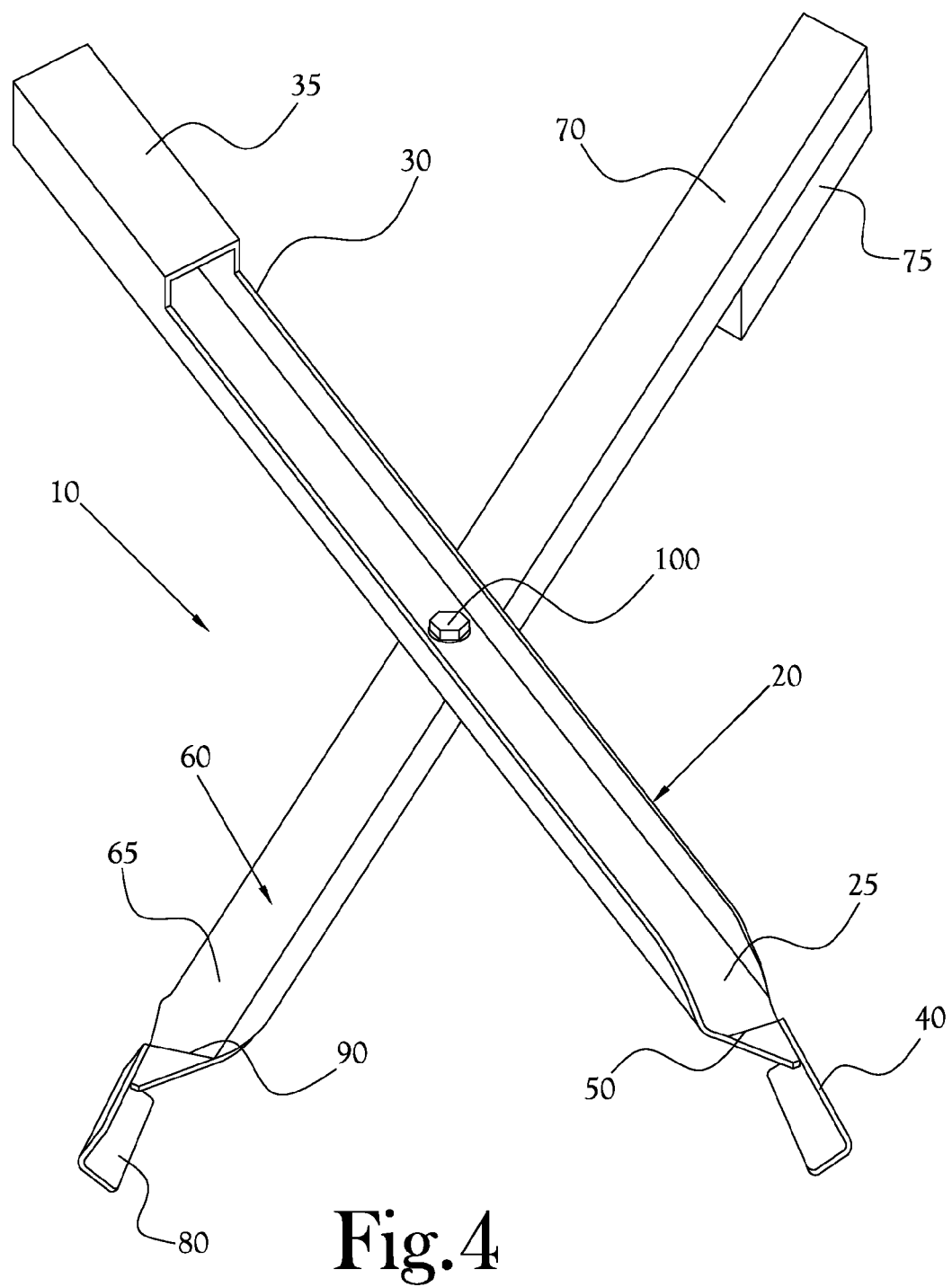
FIG. 4 is an additional perspective view of the pivotal multi-functional grill tool illustrated in FIG. 1.
Figure 5A:
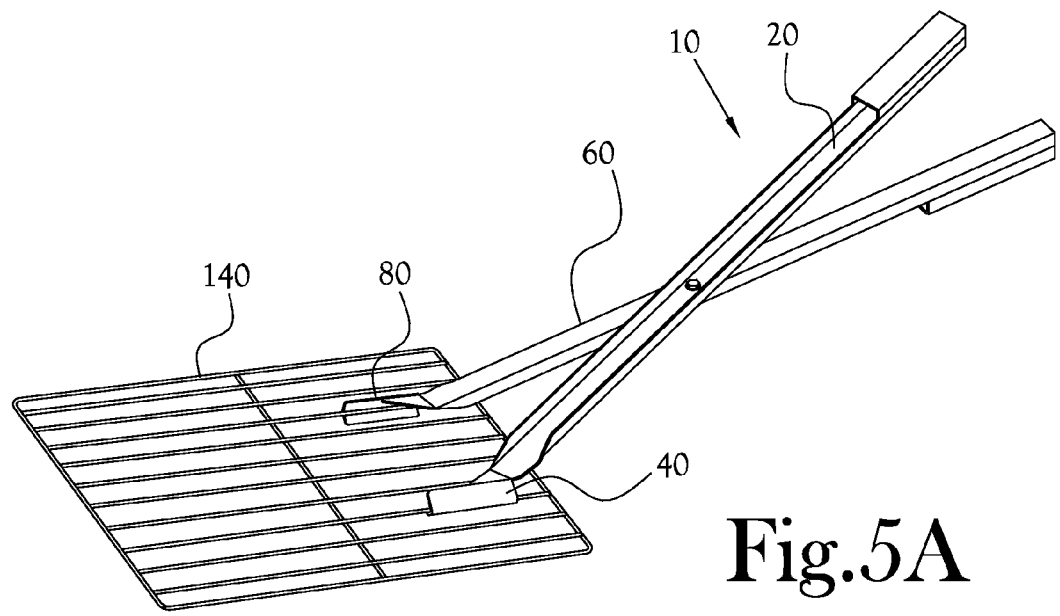
FIG. 5A is a perspective view of the pivotal multi-functional grill tool illustrated in FIG. 1 engaged in the process of lifting a grill grate.
Figure 5B:
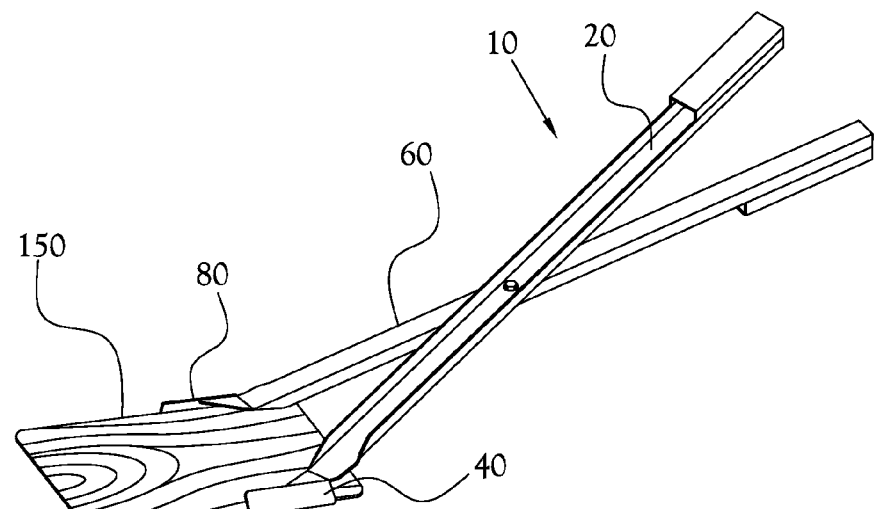
FIG. 5B is a perspective view of the pivotal multi-functional grill tool illustrated in FIG. 1 engaged in the process of lifting a grill accessory such as a cedar grilling plank.
Figure 6:
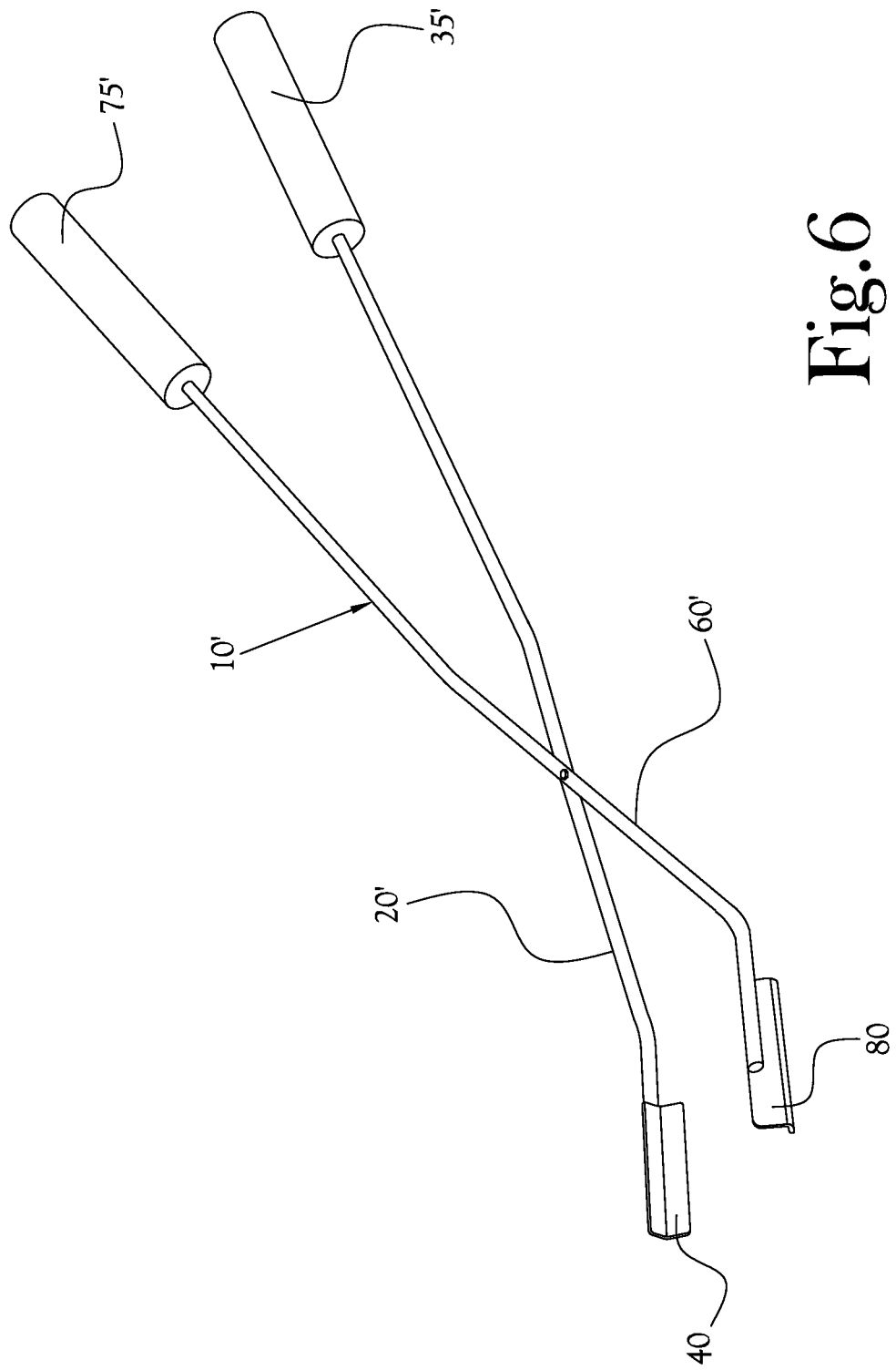
FIG. 6 is a side perspective view of a further embodiment of the pivotal multi-functional grill tool described herein.

FIGS. 1-5 illustrate a pivotal multi-functional grill tool 10 which is adapted for lifting cooking grates, such as cooking grate 140 particularly, the cooking grates commonly used with gas or charcoal-fired grills or a grill accessory such as cedar grilling plank 150, (as illustrated respectively in FIGS. 5A and 5B). In addition, the pivotal multi-functional grill tool 10, of the present invention, is adapted for distributing charcoal briquettes, lump charcoal or positioning wood chunks onto a fire for smoking purposes as well as for grasping and repositioning other grill cooking accessories, such as cedar planks, commonly used for grilling fish, or ceramic grill stones which have a variety of uses. In accordance with the present invention, the pivotal multi-functional grill tool 10 includes a first elongated arm member 20 and a second elongated arm member 60. In this regard, the first elongated arm member 20 includes a first end 25 and a second end 30. A handle 35 is disposed at the second end 30. Further, a jaw member 40 is rigidly attached to the first end 25 so as to be carried by the first elongated arm member 20. The jaw member 40 is adapted to engage at least a portion of the cooking grate 140. Similarly, the second elongated arm member 60 includes a first end 65 and a second end 70. A handle 75 is disposed at the second end 70. Further, a jaw member 80 is rigidly attached to the first end 65 so as to be carried by the first elongated arm member 60. The jaw member 80 is adapted to engage at least a portion of the cooking grate 140.

Jaw member 40 and jaw member 80, as stated above, are each adapted to engage at least a portion of the cooking grate 140. In this regard, in an exemplary embodiment and as best illustrated in FIG. 4, jaw members 40 and 80 have an "L" shaped cross section and are disposed on elongated arm members 20 and 60, respectively, in opposition to one another. In this manner, elongated arm members 20 and 60 being pivotally attached, as the handles 35 and 75 are brought closer together, the jaw members 40 and 80 are brought closer together so as to grasp at least a portion of the cooking grate 140 there between, see e.g. FIGS. 5A and 5B. Further, in an exemplary embodiment, the jaw members 40 and 80 are disposed at an angle to the elongated arm members 20 and 60, respectively. This angle is chosen such that the jaw members 40 and 80 are substantially parallel to one another when they are spaced apart a selected distance. In an exemplary embodiment, the selected distance is in a range of from approximately 4 inches to approximately 9 inches.

As stated above, the first elongated arm member 20 and the second elongated arm member 60 are pivotally attached to one another. In this regard, first elongated arm member 20 further includes a bore member 45. Similarly, second elongated arm member 60 further includes a bore member 85 which registers with bore member 45 when the first elongated arm member 20 and the second arm member 60 are aligned for pivotal attachment to one another. In an exemplary embodiment, a bolt 100 defines a pivot pin. When assembled, as best illustrated by the exploded view in FIG. 3, bolt 100 passes through bore members 45 and 85. In an exemplary embodiment, a washer 110 defines a spacer between the first elongated arm member 20 and the second arm member 60. Thus, in an exemplary embodiment, bolt/pivot pin 100 passes through a first washer 105, bore member 45, washer/spacer 110, bore member 85, and the assembly is secured with a second washer 115 and nut 120.

In an exemplary embodiment, first elongated arm member 20 further includes a planar bend 50 proximate the jaw member 40. Similarly, second elongated arm member 60 further includes a planar bend 90 proximate the jaw member 80. Bends 50 and 90 define an obtuse angle with elongated arm members 20 and 60, respectively, and are each adapted such that, in use, when the jaw members 40 and 80 are substantially parallel to cooking grate 140, the elongated arm members 20 and 60 define an acute angle with the cooking grate 140. Planar bend 50 is connected to the upper plane of L-shaped jaw member 40; and planar bend 90 is connected to the upper plane of L-shaped jaw member 80. Further, it will be appreciated that the jaw members 40 and 80 as illustrated are an exemplary embodiment of the jaw members of the present invention. For example, although the afore described jaw members 40 and 80 have been illustrated as having smooth edges, the jaw members may also have serrated edges and/or the jaw members may be adjustable. The embodiments described herein are intended for the purpose of illustration and not as limitation.

It will be appreciated by those skilled in the pivotal tool art that in the preferred illustrated embodiment, the elongated arm members 20 and 60 define class 1 levers with the pivot pin 100 disposed between the jaw members 40, 80, which are disposed proximate first ends 25 and 65, and the handle members 35, 70. However, in an alternate embodiment, the elongated arm members 20 and 40 could define class 2 levers with the pivot pin 100 disposed proximate first ends 25 and 65 and with the jaw members 40, 80, disposed between the pivot pin 100 and the handle members 35, 70. Further, it should be understood that while the illustrated elongated arm members 20 and 60 have a channel shaped cross-section, an alternate embodiment pivotal multi-functional grill tool 10' has elongated arm members 20' and 60' which have a substantially cylindrical cross-section. Further, in this embodiment, handle members 35' and 75', respectively could also have cylindrical cross-sections.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A pivotal multi-functional grill tool, said pivotal multi-functional tool comprising a first elongated arm member and a second elongated arm member, each said elongated arm member having first and second ends;
a handle member disposed at said second end of each said elongated arm member;
an L-shaped jaw member carried by each said elongated arm member, said jaw member adapted to engage at least a portion of a grill item selected from a group consisting of a grill grate, a ceramic grill stone, charcoal briquettes, lump charcoal, chunks of wood, and a cedar plank;
a bend disposed at said first end of each said elongated arm member and proximate each said L-shaped jaw member such that said bend is connected to a top plane of said L-shaped jaw member, said bend defining an obtuse angle with said elongated arm member whereby said elongated arm member defines an acute angle with the cooking grate when said jaw member is substantially parallel with the cooking grate, wherein said bend defines a triangular-shaped planar bend, and;
a pivot pin for pivotally attaching said first elongated arm member and said second elongated arm member, wherein said pivotal multi-functional tool is adapted for lifting a cooking grate of a grill and is further adapted for lifting and positioning other hot items within a grill environment.

2. The pivotal multi-functional grill tool of claim 1 wherein said jaw member carried by said first elongated arm member opposes said jaw member carried by said second elongated arm member such that said jaw members grasp at least a portion of the cooking grate disposed between said opposing jaw members.

3. The pivotal multi-functional grill tool of claim 1 wherein said jaw members are disposed proximate said first ends of said first and second elongated arm members and further wherein said pivot pin is disposed between said jaw members and said handle members.

4. The pivotal multi-functional grill tool of claim 1 wherein said jaw members have substantially smooth edges.

5. The pivotal multi-functional grill tool of claim 1 wherein said jaw members have serrated edges.

6. The pivotal multi-functional grill tool of claim 1 wherein said elongated arm members have a channel shaped cross section.

7. The pivotal multi-functional grill tool of claim 1 wherein said elongated arm members have a substantially cylindrical cross-section.

8. A pivotal multi-functional grill tool, said pivotal multi-functional tool comprising a first elongated arm member and a second elongated arm member, each said elongated arm member having first and second ends;
a handle member disposed at said second end of each said elongated arm member;
an L-shaped jaw member carried by each said elongated arm member, said jaw member adapted to engage at least a portion of a grill item selected from a group consisting of a grill grate, a ceramic grill stone, charcoal briquettes, lump charcoal, chunks of wood, and a cedar plank, wherein said jaw member is disposed at an angle to a said elongated arm member;
a planar bend disposed at said first end of each said elongated arm member and proximate each said L-shaped jaw member such that said planar bend is connected to a top plane of said L-shaped jaw member, said planar bend defining an obtuse angle with said elongated arm member whereby said elongated arm member defines an acute angle with the cooking grate when said jaw member is substantially parallel with the cooking grate, and further are substantially parallel to one another when spaced apart a selected distance, and;
a pivot pin for pivotally attaching said first elongated arm member and said second elongated arm member, wherein said pivotal multi-functional tool is adapted for lifting a cooking grate of a grill and is further adapted for lifting and positioning other hot items within a grill environment.

9. The pivotal multi-functional grill tool of claim 8 wherein said jaw members are disposed proximate said first ends of said first and second elongated arm members and further wherein said pivot pin is disposed between said jaw members and said handle members.

10. The pivotal multi-functional grill tool of claim 8 wherein said planar bend defines a triangular-shaped planar bend.

11. The pivotal multi-functional grill tool of claim 8 wherein said jaw members have substantially smooth edges.

12. The pivotal multi-functional grill tool of claim 8 wherein said jaw members have serrated edges.

13. The pivotal multi-functional grill tool of claim 8 wherein said elongated arm members have a channel shaped cross section.

14. The pivotal multi-functional grill tool of claim 8 wherein said elongated arm members have a substantially cylindrical cross-section.

* * * * *